United States Patent
Yan et al.

(10) Patent No.: US 9,933,583 B2
(45) Date of Patent: Apr. 3, 2018

(54) OPTICAL FIBER CONNECTOR AND OPTICAL FIBER CONNECTOR COMPONENT SYSTEM

(71) Applicant: Huawei Technologies Co., Ltd., Shenzhen (CN)

(72) Inventors: Xiongwei Yan, Shenzhen (CN); Xiaobo Lan, Wuhan (CN); Xin Fu, Wuhan (CN); Jianpeng Hu, Wuhan (CN); Shirong Chen, Shenzhen (CN); Yu Xiong, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/209,892

(22) Filed: Jul. 14, 2016

(65) Prior Publication Data

US 2016/0320567 A1 Nov. 3, 2016

Related U.S. Application Data

(63) Continuation of application No. PCT/CN2014/082157, filed on Jul. 14, 2014.

(30) Foreign Application Priority Data

Jan. 14, 2014 (CN) .......................... 2014 1 0016155

(51) Int. Cl.
*G02B 6/38* (2006.01)

(52) U.S. Cl.
CPC .......... *G02B 6/3825* (2013.01); *G02B 6/387* (2013.01); *G02B 6/3865* (2013.01);
(Continued)

(58) Field of Classification Search
None
See application file for complete search history.

(56) References Cited

U.S. PATENT DOCUMENTS

| 5,317,663 A | 5/1994 | Beard et al. |
| 5,774,611 A | 6/1998 | Nagase et al. |

(Continued)

FOREIGN PATENT DOCUMENTS

| CN | 2560956 Y | 7/2003 |
| CN | 201364401 Y | 12/2009 |

(Continued)

OTHER PUBLICATIONS

Partial English Translation and Abstract of Chinese Patent Application No. CN201654280U, Nov. 24, 2010, 4 pages.

(Continued)

*Primary Examiner* — Tina Wong
(74) *Attorney, Agent, or Firm* — Conley Rose, P.C.

(57) ABSTRACT

An optical fiber connector includes a main body (1), a sleeve (2), and a plug (3). The main body (1) includes a first cube and a second cube that are formed by means of injection molding, where a first cavity (1o) is disposed inside the first cube, and the first cavity (1o) is used to adapt to an optical fiber sub-assembly inserted from a first end face of the first cube; at least two hook-like structures (1n) are formed, by means of injection molding, on the first cube extending from a second end face that is parallel to the first end face into the first cavity (1o), and the hook-like structures (1n) are used to tightly lock the optical fiber sub-assembly when the optical fiber sub-assembly is inserted from the first end face.

20 Claims, 6 Drawing Sheets

(52) U.S. Cl.
CPC ......... *G02B 6/3869* (2013.01); *G02B 6/3893* (2013.01); *G02B 6/3897* (2013.01)

(56) References Cited

U.S. PATENT DOCUMENTS

| | | | |
|---|---|---|---|
| 5,815,618 A | | 9/1998 | Takahashi et al. |
| 5,887,095 A | | 3/1999 | Nagase et al. |
| 5,949,946 A | | 9/1999 | Debortoli et al. |
| 5,971,626 A | * | 10/1999 | Knodell ............... G02B 6/3825 385/60 |
| 5,993,071 A | | 11/1999 | Hultermans |
| 6,431,762 B1 | | 8/2002 | Taira et al. |
| 6,785,460 B2 | * | 8/2004 | de Jong ............... G02B 6/3807 385/134 |
| 8,224,146 B2 | * | 7/2012 | Hackett ............... G02B 6/3825 385/134 |
| 8,646,988 B2 | * | 2/2014 | Katagiyama ......... G02B 6/3825 385/55 |
| 9,618,702 B2 | * | 4/2017 | Takano ................ G02B 6/3825 |
| 2011/0200294 A1 | | 8/2011 | Case |
| 2013/0177279 A1 | | 7/2013 | Nelson |
| 2014/0023322 A1 | * | 1/2014 | Gniadek ............... G02B 6/3825 385/56 |
| 2015/0078717 A1 | * | 3/2015 | Lin ...................... G02B 6/3898 385/134 |

FOREIGN PATENT DOCUMENTS

| | | |
|---|---|---|
| CN | 201440177 U | 4/2010 |
| CN | 101702048 A | 5/2010 |
| CN | 201654280 U | 11/2010 |
| CN | 102132182 A | 7/2011 |
| CN | 202025107 U | 11/2011 |
| CN | 202075454 U | 12/2011 |
| CN | 202075459 U | 12/2011 |
| EP | 1388700 A1 | 2/2004 |
| JP | S6278507 A | 4/1987 |
| JP | H0425807 A | 1/1992 |
| JP | H08248263 A | 9/1996 |
| JP | H09329725 A | 12/1997 |
| JP | 2001033658 A | 2/2001 |

OTHER PUBLICATIONS

"Connectors Fiber Optic Catalog Amphenol Fiber Optic Products," Jan. 2002, 34 pages.
Foreign Communication From a Counterpart Application, Chinese Application No. 201410016155.4, Chinese Office Action dated Dec. 16, 2015, 5 pages.
Foreign Communication From a Counterpart Application, Chinese Application No. 201410016155.4, Chinese Search Report dated Nov. 25, 2015, 2 pages.
Foreign Communication From a Counterpart Application, European Application No. 14815560.9, Extended European Search Report dated Sep. 16, 2015, 9 pages.
Foreign Communication From a Counterpart Application, PCT Application No. PCT/CN2014/082157, English Translation of International Search Report dated Sep. 2, 2014, 3 pages.
Foreign Communication From a Counterpart Application, PCT Application No. PCT/CN2014/082157, English Translation of Written Opinion dated Sep. 3, 2014, 8 pages.
Machine Translation and Abstract of Japanese Publication No. JPH0425807, Jan. 29, 1992, 11 pages.
Machine Translation and Abstract of Japanese Publication No. JPS6278507, Apr. 10, 1987, 7 pages.
Foreign Communication From a Counterpart Application, Japanese Application No. 2016-546453, Japanese Office Action dated Aug. 1, 2017, 2 pages.
Foreign Communication From a Counterpart Application, Japanese Application No. 2016-546453, English Translation of Japanese Office Action dated Aug. 1, 2017, 3 pages.

* cited by examiner

OPTICAL FIBER CONNECTOR AND OPTICAL FIBER CONNECTOR COMPONENT SYSTEM

CROSS-REFERENCE TO RELATED APPLICATIONS

This application is a continuation application of international application number PCT/CN2014/082157 filed on Jul. 14, 2014, which claims priority to Chinese patent application number 201410016155.4 filed on Jan. 14, 2014, both of which are incorporated by reference.

TECHNICAL FIELD

The present disclosure relates to the computer telecommunications communications field, and in particular, to an optical fiber connector and an optical fiber connector component system.

BACKGROUND

An optical fiber connector is a passive component for implementing a flexible connection between optical fibers. Most optical fiber connectors include two individual optical fiber sub-assemblies and one individual optical fiber adapter. The two optical fiber sub-assemblies are inserted into two ends of the optical fiber adapter, locking mechanisms on the optical fiber adapter and the optical fiber sub-assemblies cooperate with each other to fasten the optical fiber sub-assemblies, and a ceramic ferrule (a ferrule includes an optical fiber) at a front end of the two optical fiber sub-assemblies is inserted into a ceramic sleeve inside the optical fiber adapter, so as to implement an interconnection of an optical fiber. All the optical fiber sub-assemblies and optical fiber adapter on two sides are separate, and can be inserted and removed.

In an existing optical fiber connector, more parts are used for each optical fiber, leading to relatively high costs and relatively long installation time required.

SUMMARY

In view of this, embodiments of the present disclosure provide an optical fiber connector, which is used to solve the foregoing technical problems, and can reduce used parts, lower manufacturing costs, and shorten installation time.

According to a first aspect, an optical fiber connector includes a main body (1), a sleeve (2), and a plug (3), where the main body (1) includes a first cube and a second cube that are formed by means of injection molding, where a first cavity (1o) is disposed inside the first cube and the first cavity (1o) is used to adapt to an optical fiber sub-assembly inserted from a first end face of the first cube; at least two hook-like structures (1n) are formed, by means of injection molding, on the first cube extending from a second end face into the first cavity (1o), and the hook-like structures (1n) are used to tightly lock the optical fiber sub-assembly when the optical fiber sub-assembly is inserted from the first end face; a first part of the second cube is accommodated in the first cavity (1o) of the first cube, and is fastened to the first cube by means of injection molding; a second part of the second cube extends along an axial direction, and protrudes on the first cube, where the axial direction indicates a direction from the first end face to the second end face; and the second cube has a third cavity (1i) that traverses along an axial direction, where the third cavity (1i) is used to accommodate the sleeve (2); and the hook-like structures (1n) and the first part of the second cube form a first gap, where the gap is used for demolding.

In a first possible implementation manner of the first aspect, a first notch (1h) and a square hole (1k) are disposed in the third cavity (1i), and used to lock the plug (3) when the plug (3) is inserted into the third cavity (1i).

In a second possible implementation manner of the first aspect, a guiding gap (1a) is opened on an upper wall outside the first cube, and is used to limit an inserting direction of the inserted optical fiber sub-assembly.

In a third possible implementation manner of the first aspect, a recess (1b) is disposed on two side walls and a lower wall outside the first cube.

In a fourth possible implementation manner of the first aspect, two stub wings (1d) are symmetrically disposed on two side surfaces of the first cube.

In a fifth possible implementation manner of the first aspect, a second notch (1j) is disposed on a side surface of the third cavity.

In a sixth possible implementation manner of the first aspect, two grooves (1l) are disposed on a lower surface of the second cube and close to a root part of the first cube.

In a seventh possible implementation manner of the first aspect, the optical fiber connector further includes a mounting accessory (4) that is fastened to the main body (1) by using the grooves (11).

In an eighth possible implementation manner of the first aspect, bosses (4c) are disposed at the top and the bottom of an interior of a square hole of the mounting accessory (4), where the bosses (4c) are used to be installed as a whole with the grooves (11) by clamping and fastening.

According to a second aspect, an optical fiber connector component system is provided, including a panel, where multiple optical fiber connectors are mounted on the panel in an inserting manner and each optical fiber connector has a structure according to the first aspect and any one of possible implementation manners of the first aspect.

The optical fiber connector provided in the present disclosure can reduce the number of parts, lower manufacturing costs, and shorten installation time.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
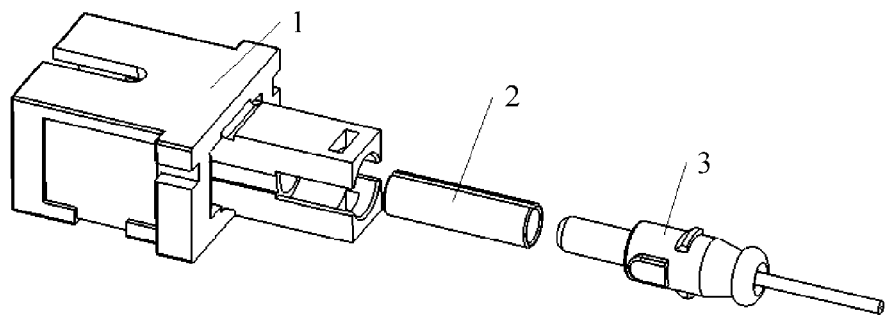
FIG. 1 is a three-dimensional schematic exploded view of a first implementation manner of an optical fiber connector according to the present disclosure.

The following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

The following describes the present disclosure by using an optical fiber connector to which a square connector (SC) adapts. Because interface standards of an existing optical fiber connector include standards of an SC, an LC, a ferrule connector (FC), and another connector, such as ST, D4, DIN, MU, MTRJ, and E2000. An embodiment of the present disclosure is described by using an SC as an example. The present disclosure is definitely applicable to other standard connectors described above, and a new connector can be obtained by modifying simply according to an idea of this embodiment of the present disclosure, which is protected by the patent application.

Refer to FIG. 1 to FIG. 8, which are a socket-type optical fiber connector according to an embodiment of the present disclosure. The optical fiber connector includes three components: a main body 1, a sleeve 2, and a plug 3, where the main body 1 includes a first cube and a second cube that are formed by means of injection molding, where a first cavity 1o is disposed inside the first cube and the first cavity 1o is used to adapt to an optical fiber sub-assembly inserted from a first end face of the first cube;

at least two hook-like structures 1n are formed, by means of injection molding, on the first cube extending from a second end face that is parallel to the first end face into the first cavity 1o, and the hook-like structures 1n are used to tightly lock the optical fiber sub-assembly when the optical fiber sub-assembly is inserted from the first end face; a first part of the second cube is accommodated in the first cavity 1o of the first cube, and is fastened to the first cube by means of injection molding; a second part of the second cube extends along an axial direction, and protrudes on the first cube, where the axial direction indicates a direction from the first end face to the second end face; the second cube has a third cavity 1i that traverses along an axial direction, where the third cavity 1i is used to accommodate the sleeve 2; and the hook-like structures 1n and the first part of the second cube form a first gap, where the gap is used for demolding.

The main body 1 may also be referred to as a socket 1. The sleeve 2 is a general component, is the same as a sleeve of a standard SC adapter, and is generally made of zirconia ceramic materials, where an inner hole is ground precisely, and there is a notch on a circumference. Tiny elastic deformation may occur on the sleeve 2, and effect of the sleeve 2 is to keep a ferrule of the plug 3 and a ferrule of an externally connected connecter to be coaxial, so that loss of an interconnection of an optical fiber is lowest. The plug 3 is a simple plug including the ferrule, a ferrule flange and a tightly packaged fiber.

Figure 2:
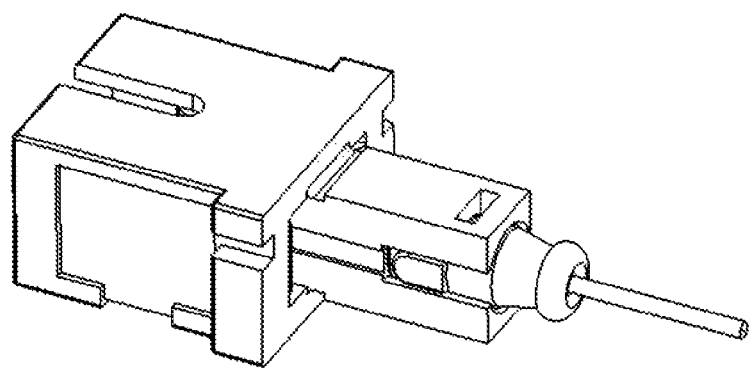
FIG. 2 is a schematic diagram of assembly of the optical fiber connector shown in FIG. 1.
Figure 3:
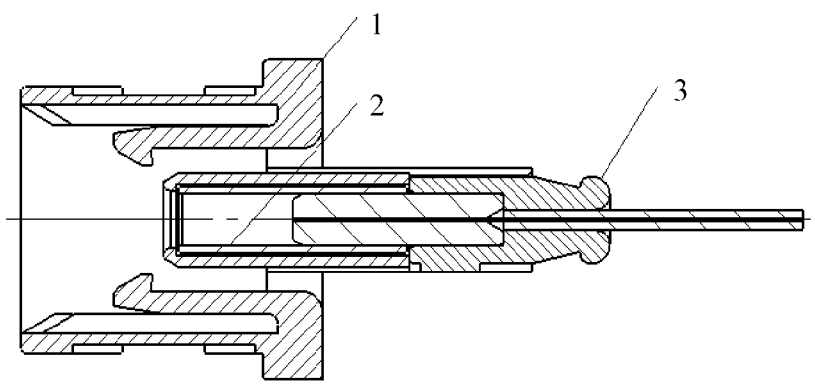
FIG. 3 is a sectional view of the optical fiber connector shown in FIG. 2.
Figure 4:
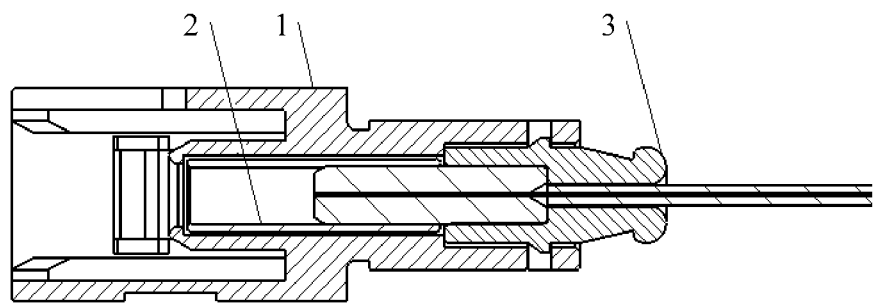
FIG. 4 is a sectional view of another direction of the optical fiber connector shown in FIG. 2.

Specifically, refer to FIG. 2, FIG. 3, and FIG. 4, which are an assembly diagram and sectional views in two directions according to the present disclosure. After assembly, the sleeve 2 is located inside a circular cavity at a center of the main body 1; the plug 3 is fastened by using an accommodation cavity and a positioning structure on the main body 1; and the plug is prevented from being removed by depending on a flip structure including upper and lower bosses on the plug 3 and a square hole on the main body. A ferrule at a front end of the plug 3 is inserted into the sleeve 2; and a front end face of the ferrule exactly reaches a medium surface, and is located at a position about half a length of the sleeve 2, so as to ensure that a contact surface of the plug 3 and an externally inserted standard SC is located on the medium surface. An interface integratedly facing outwards in the present disclosure is a standard SC adapter interface and can directly accommodate insertion of a standard SC, so as to complete an interconnection of an optical fiber.

Certainly, persons of ordinary skill in the art may also complete a transformation design of an external interface of the main body 1 according to a standard LC adapter interface, a standard FC adapter interface, or another standard adapter interface, so that the external interface can directly accommodate insertion of a standard LC, a standard FC, or another standard connector, so as to complete an interconnection of an optical fiber.

Figure 5:
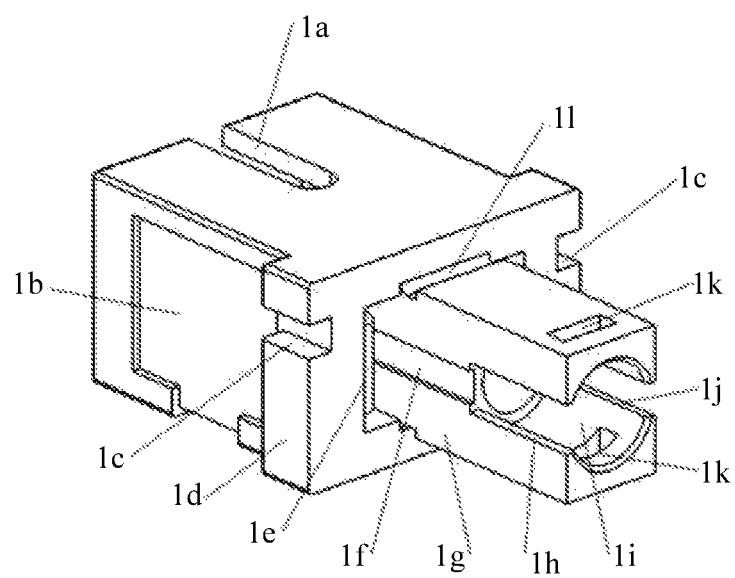
FIG. 5 is an axonometric view of a main body shown in FIG. 1.
Figure 6:
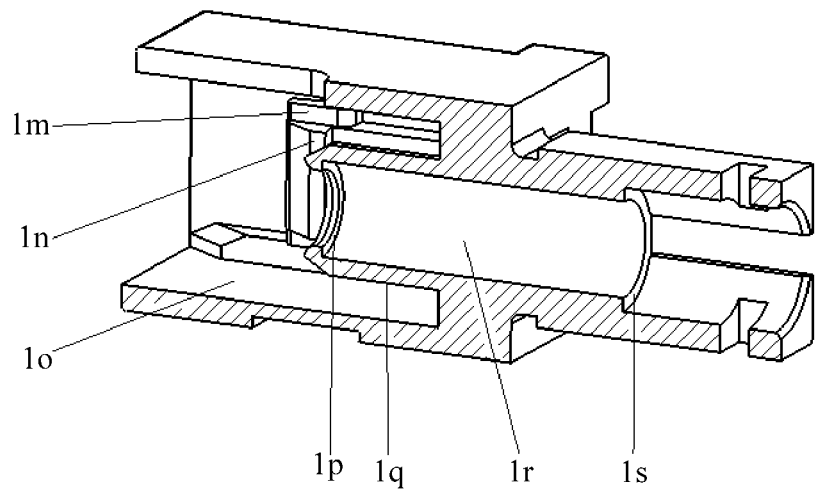
FIG. 6 is a three-dimensional sectional view of the main body shown in FIG. 5.
Figure 7:
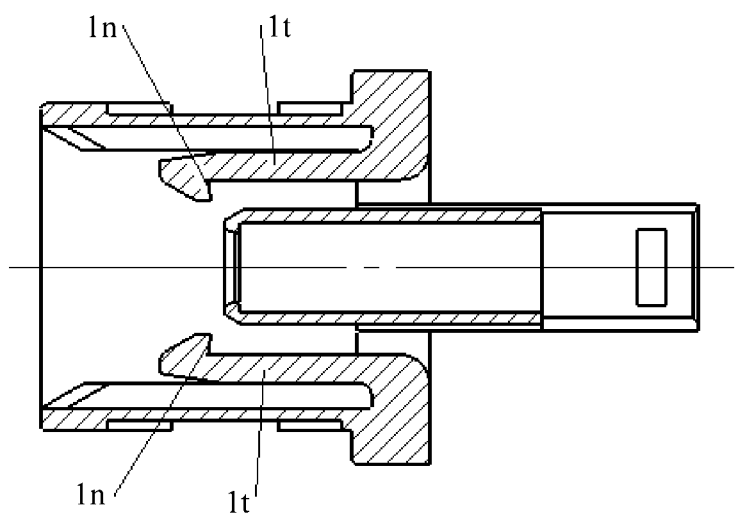
FIG. 7 is a sectional view of the main body shown in FIG. 5.
Figure 8:
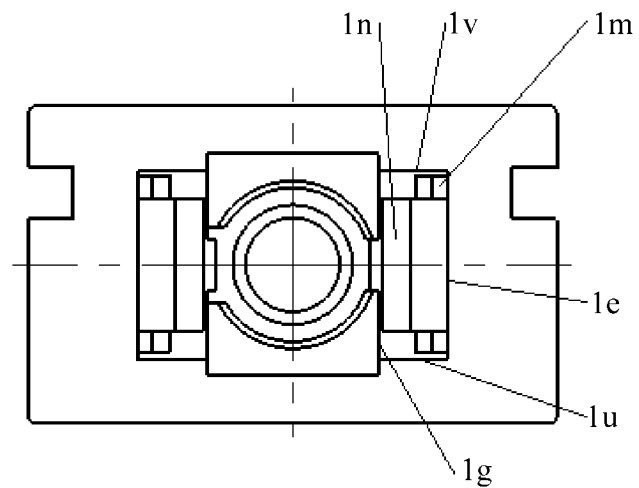
FIG. 8 is a forward schematic diagram of the main body viewed from a back end in FIG. 5.

Refer to FIG. 5, FIG. 6, FIG. 7, and FIG. 8, which are the main body 1 in this embodiment of the present disclosure. An external form of the part is comprised of two interconnected cubes, where a larger first cube is similar to a half of a structure of a standard SC adapter in shape, and serves as a standard SC adapter interface, and a smaller second cube is used to accommodate and fasten the plug 3. As shown in FIG. 6, there is a first cavity 1o inside the first cube, where the first cavity 1o may be of a square shape or a cylindrical shape, there is a cylinder 1q at a center of the first cavity 1o, a cylinder-shaped second cavity 1r is disposed at a center of the cylinder 1q and is used to accommodate the sleeve 2; a step 1p is at a front end of the second cavity 1r and is used to prevent the sleeve 2 from being removed from the front end; and a positioning step 1s is at a back end of the second cavity 1r and is used for axial positioning when the plug 3 is inserted, so that the front end face of the ferrule of the plug 3 is exactly located on a medium surface at half a length of the second cavity 1r. Two cantilevers 1t (referring to FIG. 7) are symmetrically distributed on two sides of the cylinder 1q and located in the first cavity 1o, top ends of the two cantilevers 1t are barbs 1n and bosses 1m (referring to FIG. 6 and FIG. 7). The cylinder 1q, two cantilevers 1t, two barbs 1n, and two bosses 1m in the present disclosure form a lock cylinder structure similar to an SC adapter, and are integrated with a housing of the cavity 10; and the barbs 1n and the bosses 1m at the top ends of the two cantilevers 1t can be demolded from two sides of the second cube in a manufacturing aspect. For specific demolding space, refer to FIG. 8. The main body 1 is symmetrical by using a vertical middle plane as a symmetrical plane, where demolding space on one side is a cavity surrounded by 1g, 1e, 1u, and 1v. It may be seen from FIG. 8 that, the cavity may be used for demolding, and all the barbs 1n and the upper and lower bosses 1m can be seen in this viewing direction. Therefore, a demolding obstacle does not exist. In the present disclosure, the first cube, the first cavity 1o, the cylinder 1q and the internal sleeve 2, the cantilevers 1t, and the barbs 1n and the bosses 1m on the cantilevers 1t together form an SC adapter interface that can accommodate insertion of a standard SC and lock the SC. An exterior of the first cube also has some characteristics similar to a standard SC adapter. As shown in FIG. 5, a guiding gap 1a is opened on an upper wall, and cooperates with a guiding key on a common SC to limit that an inserting direction of the SC is unique. A relatively shallow recess (1b) is reserved on two side walls and a lower wall outside the first cube, and is used, when it is necessary, to mount a metal card frequently used by the standard SC adapter, so that the optical fiber connector in the present disclosure can be mounted on a panel. Two stub wings 1d are symmetrically disposed on two side surfaces of the first cube, which facilitates playing fastening and positioning roles when the present disclosure is integrated into another component. The two stub wings 1d are similar to two "short ears" of a common SC "short ear" adapter. A gap 1c is disposed at a mid-upper part of the two stub wings 1d, which facilitates fastening in some special application scenarios, for example, the gap 1c is used for cooperating with another structural component, and the main body 1 and the whole connector can be fastened to a circuit board.

Referring to FIG. 5, there is a third cavity 1i interconnected with the second cavity 1r (referring to FIG. 6) inside the second cube, where the third cavity 1i is used to accommodate the plug 3. There are a wider first notch 1h and a narrower second notch 1j on two sides of the third cavity 1i, where a width of the first notch 1h is slightly greater than a width of a guiding key 31a (referring to FIG. 9) on the plug 3, and a width of the second notch 1j is less than the width of the guiding key 31a, so that an inserting direction of the plug 3 can only be unique, and this structure can have fool-proof effect for an APC plug for which an inserting direction needs to be limited. Meanwhile, the first notch 1h and the second notch 1j enable upper and lower sides of the third cavity 1i to be similar to a cantilever structure, which may cause elastic deformation, so as to facilitate insertion of the plug 3. Square through holes 1k are opened on an upper surface and a lower surface of the second cube, and the square holes 1k cooperate with upper and lower bosses 31b (referring to FIG. 9) on an external circular surface of the plug 3 to prevent the plug 3 from being removed. The third cavity 1i, the first notch 1h, and the square holes 1k form a structure that accommodates insertion of the plug 3 and locks the plug 3. Two small grooves 11 are reserved on the upper surface and lower surface of the second cube and close to a root part of the first cube, and are used to mount, when it is necessary, a plastic card accessory 4 (referring to FIG. 11 and FIG. 12) equipped in the present disclosure. An external form of the second cube may be a square shape in this solution, and may also be constructed into a circular shape or another shape.

Figure 9:
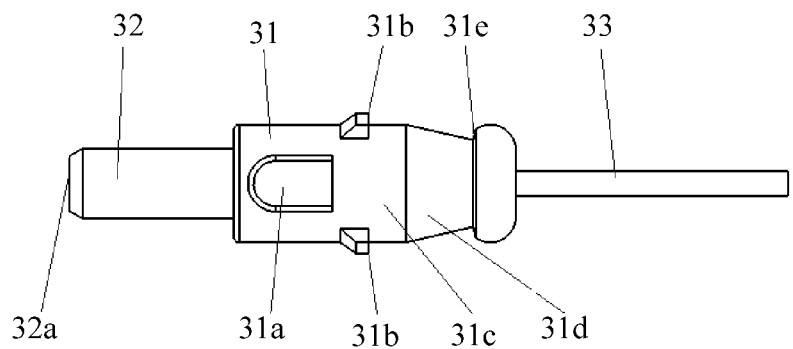
FIG. 9 is a schematic diagram of a plug shown in FIG. 1.
Figure 10:
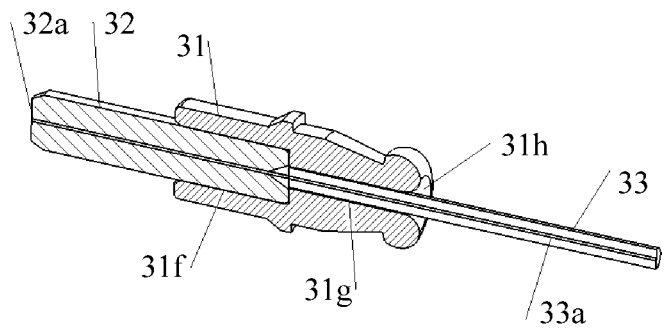
FIG. 10 is a three-dimensional sectional view of the plug shown in FIG. 9.

Refer to FIG. 9 and FIG. 10, which are an assembly diagram and a sectional view of the plug 3 according to the present disclosure. The plug 3 is fastened to form a whole by using a ferrule flange 31, a ferrule 32, and a tightly packaged fiber 33 after common connector manufacturing processes, such as glue spreading, fiber threading, curing, and ferrule end face grinding, so as to form a simple connector. Referring to FIG. 9, a front section of the ferrule flange 31 is a cylinder 31c, a section of a transition circular conical surface 31d is adjacent to the cylinder 31c, and a step surface 31e is connected to the circular conical surface 31d. The present disclosure is generally used in an application scenario in which the plug 3 is not frequently inserted and removed. However, when the plug 3 needs to be inserted and removed occasionally, a simple tool may be equipped, and the step surface 31e is used to remove the plug 3. Two bosses 31b are symmetrically disposed at the top and the bottom of an external circular surface of the cylinder 31c, and cooperate with the square holes 1k (referring to FIG. 5) on the main body 1 to fasten the plug 3. A boss guiding key 31a is disposed on one side of the cylinder 31c, is used to limit an inserting direction of an APC plug, and plays a role the same as that of a positioning key on a housing of a standard SC. Referring to FIG. 10, a larger first circular hole 31f and a smaller second circular hole 31g are disposed at a center of an interior of the ferrule flange 31. The first circular hole 31f is interconnected with the second circular hole 31g. The first circular hole 31f is used to hold a ferrule 32, and cooperates with the ferrule 32 by means of interference fit or adhesive dispensing reinforcement. The second circular hole 31g is used to hold the tightly packaged fiber 33, and is bonded with the tightly packaged fiber by means of adhesive injection. A relatively large rounding 31h is disposed at an outlet of the second circular hole 31g, which enables the tightly packaged fiber 33 to perform better transition when being bended. The ferrule 32 at a front end of the plug is the same as a ferrule of a common SC, and is generally made of zirconia ceramic materials currently. A front end face 32a of the ferrule needs to be ground precisely. A shape of the end face may be ground to an ultra-physical contact (UPC) shape and an APC shape that are the same as shapes of a UPC end face and an APC end face of a standard SC respectively. For the APC plug 3, refer to FIG. 14. A main characteristic thereof lies in that: the front end face 32a of the ferrule is an oblique plane and generally has an 8-degree angle with a vertical plane, and an oblique direction of an oblique angle in the present disclosure needs to be in a same direction with a radial direction of the guiding key 31a. Referring to FIG. 10, the tightly packaged fiber 33 at a back end of the plug is generally a 0.9 millimeter (mm) tightly packaged fiber. There is a 0.125 mm bare fiber at a center of the tightly packaged fiber 33. The bare fiber passes through a micro hole at a center of the ferrule to reach the front end face 32a of the ferrule, and is ground precisely together with the end face 32a of the ferrule. When the present disclosure is applied to an optical fiber or cable with another dimension, only simple improvement needs to be performed on the second circular hole 31g of the ferrule flange 31 and an optical cable fastening manner or a corresponding accessory needs to be added, which also falls within the protection scope of the present disclosure.

Figure 11:
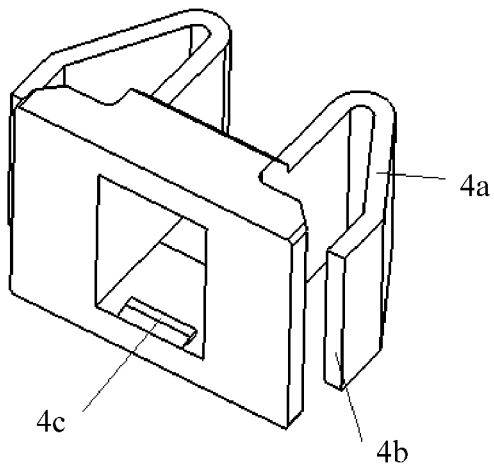
FIG. 11 is an axonometric view of a plastic card attached when an optical fiber connector in the present disclosure is used for panel mounting.
Figure 12:
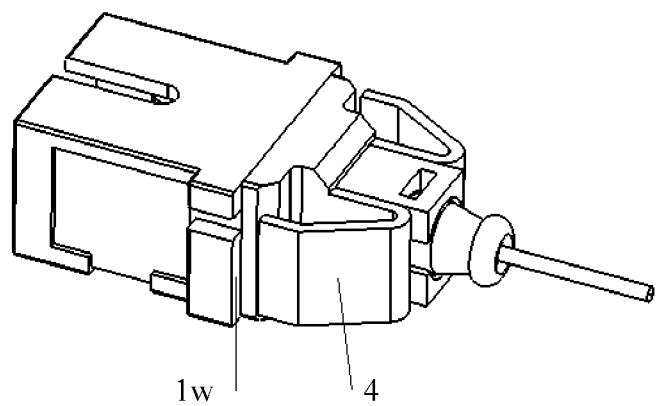
FIG. 12 is a schematic diagram of assembly of the plastic card shown in FIG. 11 and an optical fiber connector in the present disclosure.

Refer to FIG. 11 and FIG. 12, which are a plastic mounting accessory 4 designed in the present disclosure. In some application scenarios, the present disclosure may need to be directly inserted into a square hole on a mounting panel for fastening. Therefore, two small grooves 11 (as shown in FIG. 5) are reserved on the main body 1, and bosses 4c are disposed at the top and the bottom of an interior of the square hole of the mounting accessory 4, and form a whole with the grooves 11 by champing and fastening (whole effect is shown in FIG. 12). When the present disclosure is inserted into the reserved square hole on the mounting panel, elastic deformation occurs on cantilevers 4a on two sides, which leads to smooth insertion. When the present disclosure is inserted in place, the cantilevers 4a flicks off to clamp and fasten the panel between two surfaces 4b and 1w, so as to achieve an objective of fastening the connector.

Figure 13:
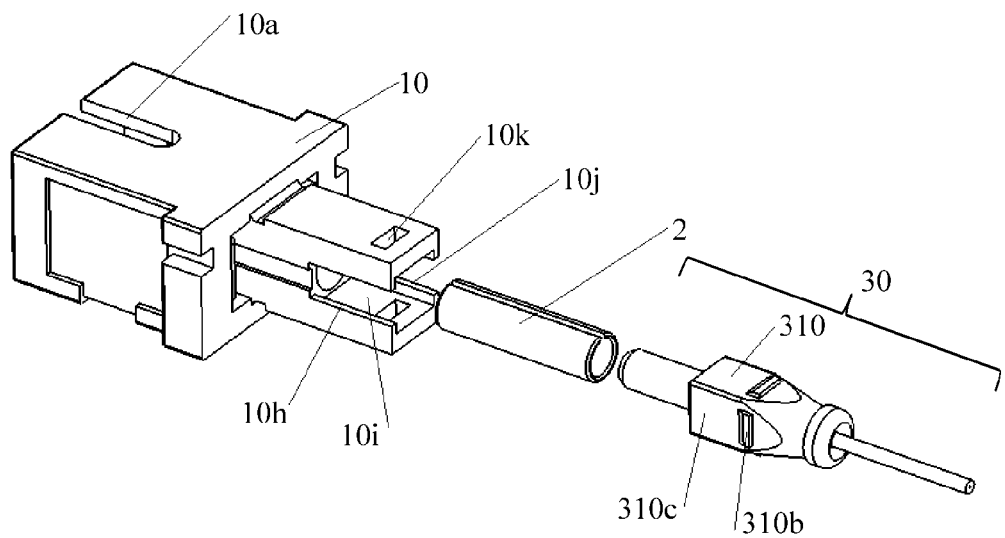
FIG. 13 is a three-dimensional schematic exploded view of a core tunable solution embodiment of an optical fiber connector according to the present disclosure.

Refer to FIG. 13, a cooperation structure of the main body 1 and the ferrule flange 31 of the plug 3 in the first embodiment of the present disclosure is changed simply to obtain a main body 10 and a plug 30 (ferrule flange 310), so as to enable the present disclosure to be applicable to an application in which there is a core tuning requirement. Specifically, a third cavity of a second cube of the main body 10 is changed to a square cavity 10i, and widths of a first notch 10h and a second notch 10j on two sides of the third cavity 10i are equal, and are slightly greater than widths of bosses 310b on the plug 30. A front end of the ferrule flange 310 of the plug 30 is changed to a cube 310c. A same boss 310b is disposed on each of four surfaces at a periphery of the cube 310c. The bosses 310b cooperate with square holes 10k on the main body 10 to prevent the plug 30 from being removed. In this way, after simple change, the plug 30 may be inserted into the square cavity 10i of the main body 10 in four directions for fastening, so that a fool-proof function of limiting that an inserting direction is unique is canceled in the first embodiment. However, core tuning may be performed on the plug 30 by using a core tuner, and an eccentric direction of a fiber core in the plug 30 is measured by using a concentricity tester (or is referred to as a core tuner) frequently used in the industry, a main body is inserted for fastening by keeping the eccentric direction in a direction when a deviation of 0 degree±50 degrees exists between the eccentric direction and a direction of a guiding gap 10a of the main body 10, which is similar to a frequently used core tuning process and applicable to a high-grade optical fiber connector with a lower interchangeability insertion loss requirement.

Figure 14:
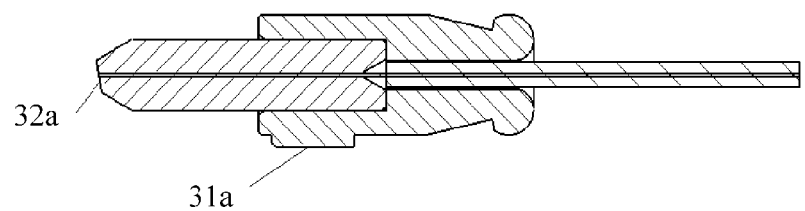
FIG. 14 is a schematic diagram of the plug shown in FIG. 9 according to an angled physical contact (APC) embodiment.

Refer to FIG. 14, which is a plug 3a in a second implementation manner of the present disclosure, structures of the plug 3a provided in the second implementation manner and the plug 3 (referring to FIG. 9 and FIG. 10) provided in a first implementation manner are basically the same, implementation functions thereof are similar, and a difference thereof lies in that: an end face 32a of a ferrule in the plug 3a is an APC end face, which can improve return loss performance of an interconnection of an optical fiber in an actual application.

In this implementation manner, the APC end face 32a of the ferrule is ground to an 8-degree oblique angle, and in a direction of an entire circumference, an oblique direction is consistent with a direction of a guiding key 31a (a direction shown in FIG. 14).

Figure 15:
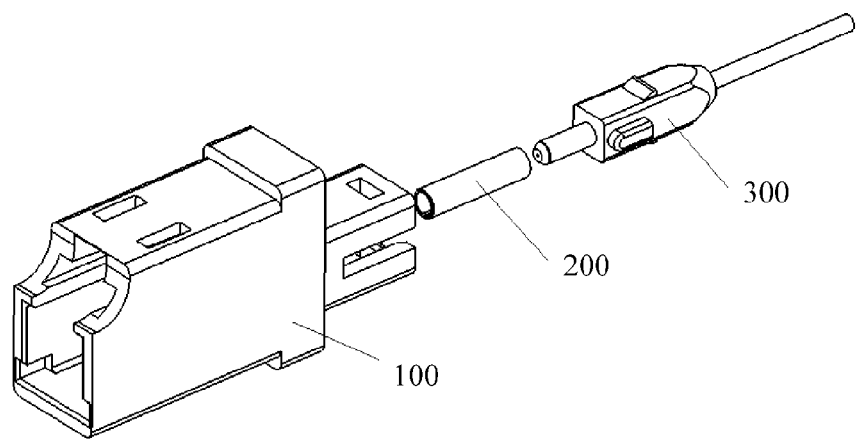
FIG. 15 is a schematic diagram of an embodiment in which there are a Lucent connector (LC) interface and an LC plug shown in FIG. 1.

Refer to FIG. 15, a form of an interface of a first half of the main body 1 of the present disclosure may be modified simply according to an LC interface standard; and a part cooperating with a ferrule flange is adjusted simply, so as to obtain a main body 100 adapting to a standard LC. A sleeve and a ferrule is changed to an LC sleeve and an LC ferrule, and a structure of a ferrule flange is modified simply to adapt to the ferrule, so that an LC integrated socket-type connector is obtained, where both the number of parts and a connection relationship of the parts of the LC integrated socket-type connector are the same as those in the present disclosure.

An embodiment of the present disclosure further discloses an optical fiber connector component system, including a panel, where multiple optical fiber connectors described above are mounted on the panel in an inserting manner, and an optical fiber sub-assembly adapting to the optical fiber connector may be an SC, LC, and FC optical fiber sub-assembly, and may also be another type of optical fiber sub-assembly.

An optical fiber connector provided in an embodiment of the present disclosure can reduce the number of parts, lower manufacturing costs, and shorten installation time.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An optical fiber connector comprising:
    a sleeve;
    a plug;
    a main body coupled to the plug, wherein the main body comprises:
        a first cube comprising:
            a first end face;
            a second end face parallel to the first end face; and
            a first cavity configured to adapt to an optical fiber sub-assembly inserted from the first end face; and
        a second cube comprising:
            a first part accommodated in the first cavity and fastened to the first cube;
            a second part extending along an axial direction and protruding on the first cube, wherein the axial direction is from the first end face to the second end face;
            a second cavity traversing along the axial direction and configured to accommodate the sleeve, wherein the sleeve is disposed within the second cavity;
            a lip at a first end of the second cavity, wherein the lip is configured to prevent the sleeve from being removed from the first end face of the first cube; and
            a third cavity having a first end at a second end of the second cavity that is opposite the first end of the second cavity, wherein the third cavity comprises a first notch and a square hole configured to lock the plug when the plug is inserted into the third cavity; and
    hook-like structures formed on the first cube and extending from the second end face into the first cavity,
    wherein each of the hook-like structures includes a cantilever, and
    wherein the hook-like structures are configured to tightly lock the optical fiber sub-assembly when the optical fiber sub-assembly is inserted from the first end face.

2. The optical fiber connector of claim 1, wherein the second cavity is cylindrical, wherein inner surfaces of the first cube and the second cube radially enclose the second cavity, wherein the optical fiber connector further comprises a guiding gap on an upper wall outside the first cube, and wherein the guiding gap is configured to limit an inserting direction of the optical fiber sub-assembly.

3. The optical fiber connector of claim 1, further comprising:
    side walls outside the first cube;
    a lower wall outside the first cube; and a recess disposed on the side walls and the lower wall.

4. The optical fiber connector of claim 1, further comprising:
   two side surfaces of the first cube; and
   stub wings symmetrically disposed on the two side surfaces.

5. The optical fiber connector of claim 1, wherein the third cavity further comprises a second notch configured to further lock the plug when the plug is inserted into the third cavity.

6. The optical fiber connector of claim 1, wherein the first cube further comprises a root part, wherein the second cube comprises an upper surface and a lower surface, and wherein the optical fiber connector further comprises two grooves disposed on the upper surface and the lower surface and close to the root part.

7. The optical fiber connector of claim 6, further comprising a mounting accessory fastened to the main body by the grooves.

8. The optical fiber connector of claim 7, wherein the mounting accessory comprises a square hole and bosses, wherein the square hole comprises an interior, wherein the interior comprise a top and a bottom, and wherein the bosses are disposed at the top and the bottom and are configured to be installed as a whole with the grooves by fastening.

9. An optical fiber connector component system comprising:
   a panel; and
   optical fiber connectors mounted on the panel,
   wherein each optical fiber connector comprises a sleeve, a plug, a main body coupled to the plug, and hook-like structures,
   wherein the main body comprises:
      a first cube comprising:
         a first end face;
         a second end face parallel to the first end face; and
         a first cavity configured to adapt to an optical fiber sub-assembly inserted from the first end face; and
      a second cube comprising:
         a first part accommodated in the first cavity and fastened to the first cube;
         a second part extending along an axial direction and protruding on the first cube, wherein the axial direction is from the first end face to the second end face;
         a second cavity traversing along the axial direction, wherein the sleeve is disposed within the second cavity; and
         a third cavity, wherein the third cavity comprises a first notch and a square hole configured to lock the plug when the plug is inserted into the third cavity,
   wherein the hook-like structures are formed on the first cube and extend from the second end face into the first cavity,
   wherein each of the hook-like structures includes a cantilever, and
   wherein the hook-like structures are configured to lock the optical fiber sub-assembly when the optical fiber sub-assembly is inserted from the first end face.

10. The system of claim 9, wherein each optical fiber connector further comprises a guiding gap on an upper wall outside the first cube, and wherein the guiding gap is configured to limit an inserting direction of the optical fiber sub-assembly.

11. The system of claim 9, wherein each optical fiber connector further comprises:
   side walls outside the first cube;
   a lower wall outside the first cube; and
   a recess disposed on the side walls and the lower wall.

12. The system of claim 9, wherein each optical fiber connector further comprises:
   two side surfaces of the first cube; and
   stub wings symmetrically disposed on the two side surfaces.

13. The system of claim 9, wherein each optical fiber connector further comprises:
   a side surface of the second cavity; and
   a second notch disposed on the side surface.

14. The system of claim 9, wherein the first cube further comprises a root part, wherein the second cube comprises an upper surface and a lower surface, and wherein each optical fiber connector further comprises two grooves disposed on the upper surface and the lower surface and close to the root part.

15. The system of claim 14, wherein each optical fiber connector further comprises a mounting accessory fastened to the main body by the grooves.

16. The system of claim 15, wherein the mounting accessory comprises a square hole and bosses, wherein the square hole comprises an interior, wherein the interior comprises a top and a bottom, and wherein the bosses are disposed at the top and the bottom and are configured to be installed as a whole with the grooves by fastening.

17. The optical fiber connector of claim 1, wherein each of the hook-like structures further includes a barb.

18. The optical fiber connector of claim 1, wherein the plug includes at least one boss configured to fit into the square hole to couple the plug to the main body.

19. An optical fiber connector comprising:
   a sleeve;
   a plug;
   a main body coupled to the plug, wherein the main body comprises:
      a first cube comprising:
         a first end face;
         a second end face parallel to the first end face; and
         a first cavity configured to adapt to an optical fiber sub-assembly inserted from the first end face; and
      a second cube comprising:
         a first part accommodated in the first cavity and fastened to the first cube;
         a second part extending along an axial direction and protruding on the first cube, wherein the axial direction is from the first end face to the second end face;
         a second cavity traversing along the axial direction and configured to accommodate the sleeve, wherein the sleeve is disposed within the second cavity;
         a lip at a first end of the second cavity, wherein the lip is configured to prevent the sleeve from being removed from the first end face of the first cube; and
         a third cavity having a first end at a second end of the second cavity that is opposite the first end of the second cavity, wherein the third cavity comprises a first notch and a square hole configured to lock the plug when the plug is inserted into the third cavity; and
   hook-like structures formed on the first cube and extending from the second end face into the first cavity, wherein the hook-like structures are configured to lock the optical fiber sub-assembly when the optical fiber sub-assembly is inserted from the first end face.

20. The optical fiber connector of claim 19, wherein the second cavity is cylindrical.

\* \* \* \* \*